United States Patent

[11] 3,598,426

| [72] | Inventor | Nathan E. Spiese<br>East Petersburg, Pa. |
|---|---|---|
| [21] | Appl. No. | 872,177 |
| [22] | Filed | Oct. 29, 1969 |
| [45] | Patented | Aug. 10, 1971 |
| [73] | Assignee | Wheel Mate Corporation<br>East Petersburgh, Pa. |

[54] TRAILER HITCH FOR MOTORCYCLE
10 Claims, 3 Drawing Figs.

[52] U.S. Cl. ............................................. 280/204, 280/497
[51] Int. Cl. ............................................. B62k 27/00
[50] Field of Search ............................................. 280/204, 292, 461, 497

[56] References Cited
UNITED STATES PATENTS
624,678   5/1899   Planes .......................... 280/204

FOREIGN PATENTS
877,165   11/1942   France .......................... 280/204
976,143   10/1950   France .......................... 280/204

*Primary Examiner*—Leo Friaglia
*Attorney*—Lowe and King

ABSTRACT: A hitch particularly adapted to fit a motorcycle or other sport vehicle with rear mounted shock absorbers is disclosed. A U-shaped frame extends forwardly along the sides of the rear wheel and is connected at the lower mount of the shock absorber. Forwardly and upwardly extending braces are connected to the top mounts for the shock absorber; shock loads from the trailer being thereby transmitted to the shock absorber of the vehicle for dissipation. The braces have an obtuse angle at a midpoint to avoid interference with the exterior of the shock absorbers and adjustment of the frame and the braces at two points allows adaptation to different vehicles.

PATENTED AUG 10 1971 3,598,426
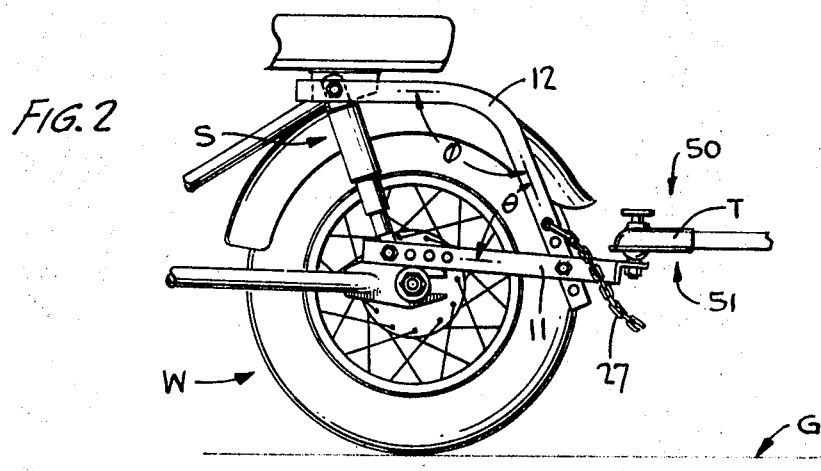
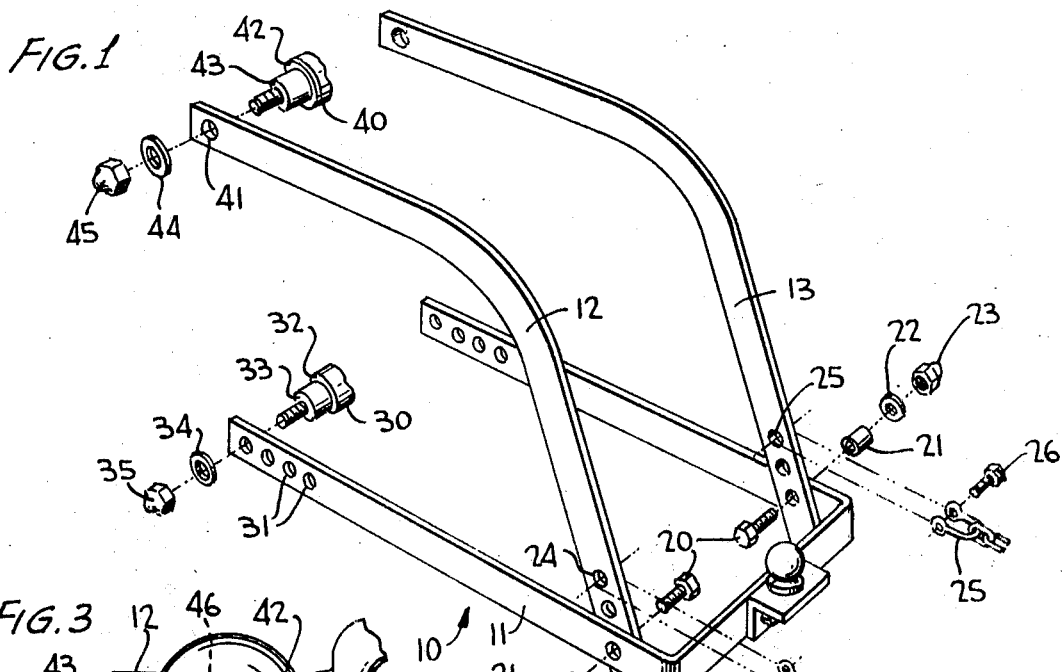
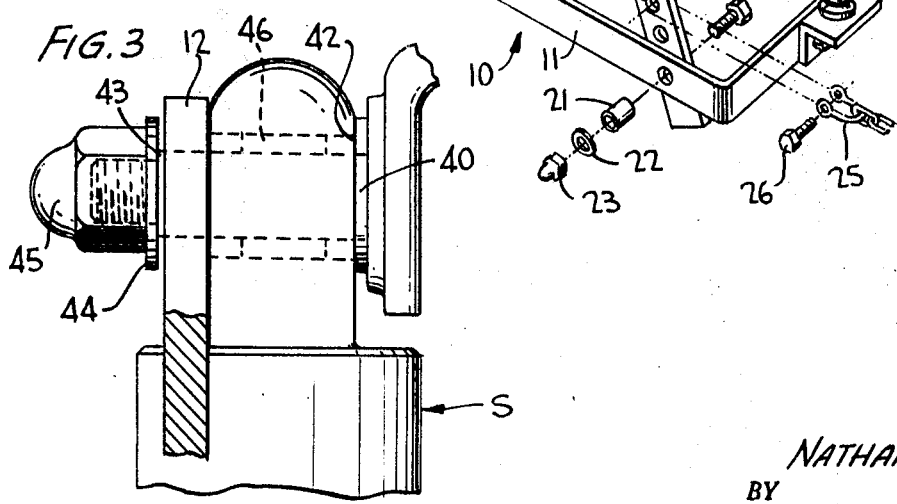
INVENTOR,
NATHAN E. SPIESE
BY Lowe & King
ATTORNEYS

TRAILER HITCH FOR MOTORCYCLE

BACKGROUND OF THE INVENTION

The present invention relates to trailer hitches, and more particularly to a trailer hitch adapted for attachment to a motorcycle or similar sport vehicle.

With the increased popularity of sport vehicles on the American scene, and the parallel increase in desire to use such vehicles in travelling and camping, the need for a simplified and safer hitch for pulling trailers behind such vehicles has arisen.

Accordingly, it is one object of the present invention to provide a trailer hitch for a sport vehicle, such as a motorcycle or the like, which is of simple construction, and therefore economical to manufacture.

It is another object of the present invention to provide a hitch of the type described which is safe for use in that the force exerted by the trailer on the motorcycle is dissipated in a unique manner and so as not to adversely affect the stability of said motorcycle.

BRIEF DESCRIPTION OF THE INVENTION

The trailer hitch of the present invention comprises a U-shaped frame having its legs extending forwardly along the sides of the rear wheel of the vehicle to which it is attached. The attachment of the forward ends of the frame is made directly to the lower mounting lugs of the rear mounted shock absorbers. Extending upwardly from the rear end of the frame are a pair of brace arms which are also positioned on opposite sides of the rear wheel and which are connected directly to the mounting lugs for the upper end of the shock absorbers. The connections at the mounting lugs and the interconnection between the arms and the frame are such as to allow pivotal movement whereby shock loads received from the trailer will be transmitted to the shock absorber of the motorcycle and thereby safely dissipated.

Adjustment means are provided at the connection between the frame and the lower end of the shock absorber and at the pivotal joint between the brace arms and the frame whereby the hitch is adaptable for different vehicles. The forward end of the brace arms and the frame extend parallel to the ground whereby there is no interference with the operation of the shock absorbers. A conventional ball-type head is positioned on the cross member of the U-shaped frame for receipt of the mating socket on the trailer tongue.

Still other objects and advantages of t present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

THE DRAWINGS

In the drawings:

FIG. 1 shows a perspective view of a trailer hitch constructed in accordance with the principles of the present invention;

FIG. 2 is a side view of the hitch of FIG. 1 suitably mounted at the rear of a motorcycle; and FIG. 3 is a detail view showing the connection of the hitch of FIG. 1 at the upper mount of the shock absorber of the motorcycle.

DETAILED DESCRIPTION

Referring now to the drawing for a more detailed discussion of the device of the present invention, there is shown in FIG. 1 a trailer hitch 10 which incorporates the principles of the present invention and can be considered as a preferred embodiment thereof. The hitch in this preferred embodiment comprises a U-shaped frame 11 and a pair of brace arms 12, 13 interconnected with the frame adjacent rear cross member 14 thereof. An angle 15 is attached in any suitable manner to said cross member 14 so as to form a mounting platform for a conventional ball-type head 16. All of the above parts are made of steel of a suitable gauge to afford support for the trailer being pulled; however, it is to be understood that any other type of metal or material can be utilized which is suitable for the purpose, and the configuration of the cross section of the members can be varied, as desired, within the scope of the present invention.

The lower ends of the brace arms 12, 13 are attached at pivotal joints to the legs of the frame 11 by bolts 20, bushings 21, washers 22 and nuts 23. The pivotal joints are to be such as to allow substantially free movement between the frame 11 and the arms 12, 13, and accordingly the length of the bushing 21 is sightly more than the combined thickness of the frame 11 and the juxtaposed arm 12, 13. As shown in FIG. 1, the bolts 20 can be selectively positioned in any one of apertures 24 for adjustment of the pivotal joint, for a purpose to be discussed below. One of the apertures 24 not in use affords a convenient attaching point for yokes 25 having fastening pins 26 to which safety chain 27 may be attached as required by highway regulations.

In accordance with the present invention, the U-shaped frame member 11 has its legs extending forwardly on opposite sides of a rear wheel W of a motorcycle or similar sport vehicle, as shown in FIG. 2. As such, the arms 12, 13 will also extend on opposite sides of the wheel W in such a manner as to appropriately position the head 16 for receiving the socket on tongue T of the trailer to be pulled. The forward end of the frame 11 is attached to the vehicle for movement with the lower mount of the vehicle shock absorber, generally designated by the referenced character S. The corresponding forward ends of the arms 12, 13 are connected for movement with the upper mount of the shock absorber S; it being understood that the connections to the shock absorber on the far side of the wheel W are identical and thus are not shown in FIG. 2 or in any of the other figures.

The connector means for the forward end of the frame 11 is, in accordance with the present invention, a lower mounting lug 30 extending outwardly from the vehicle adjacent the wheel W and constituting the same lug normally used for attachment of the shock absorber S. A selective one of apertures 31 is positioned on the lug 30 on the outside of the lower end of the shock absorber S (see FIG. 2) and between stepped shoulders 32, 33. The distance between the shoulders 32, 33 is slightly greater (usually not more than one thirty-second inch) than the combined thickness of the lower end of the shock absorber S and the leg of frame 11 so that when washer 34 and cap nut 35 are replaced, substantially free pivotal movement will be allowed between the parts.

Similarly, the upper mounting lug 40 on the vehicle is mated with an aperture 41 on the arms 12, 13. As best shown in FIG. 3 the lug 40 has an inner shoulder 41, against which the shock absorber S is mounted, and an outer shoulder 43, against which a washer 44 is positioned by cap nut 45. Again, the combined width of the arm 12 and the upper end of the shock absorber S is less than the distance between the shoulders 42, 43 so that pivotal movement without binding can take place between the parts. As is conventional, a rubber bushing 46 is positioned between the shock absorber S and the lug 40.

The aperture 31 to be selected for mounting the frame 11 is dictated by the desired amount of rear extent of the hitch 10. Basically, the selection is made to accommodate the particular vehicle upon which the hitch 10 is being attached with the general relationship of FIG. 2 being exemplary of an acceptable mounting adjustment. The appropriate aperture 24 on the arms 12, 13 is selected next such that the frame 11 will be presented substantially parallel to ground G, as illustrated in FIG. 2. An angle θ is presented between the arms 12, 13 and the frame 11, which angle θ is acute to thereby form a scissors type action with the central pivot being about the pivotal joint formed by bolts 20. An obtuse angle Φ is formed in the arms 12, 13 at a midpoint so that the forward end of said arms 12, 13 is extending substantially parallel to the frame 11, as also shown in FIG. 2. This angle Φ prevents the forward end of the arms 12, 13 from interfering with the top of the skirt of the shock absorber S (see FIG. 3) which would otherwise occur.

In operation, any vertical force caused by a shock load from the tongue T of the trailer being pulled (such as by a bump on the highway) is advantageously transmitted to the shock absorber S where it is harmlessly dissipated. That is, when a downward force is exerted on the tongue T, as represented by the arrow 50 in FIG. 2, there will be a tendency for the arms 12, 13 to pivot towards the frame 11 with a scissorslike action whereby the force is absorbed by the shock absorber S. Contrariwise, when an upward force 51 is exerted, the tendency will be for the arms 12, 13 to move away from the frame 11 with scissorslike action about the pivot joint formed by the bolts 20, whereby again the force is absorbed and not transferred to the vehicle where it could cause the rider to lose control. It is significant to note that the lever arm from the head 16 to the pivotal joint at the bolts 20 is shorter by approximately a factor of 3 than the lever arm from said joint to the shock absorber S. Thus, the forces 50, 51 from the trailer, which may be substantial due to the weight of the trailer, are accommodated without significant eduction in cushioning effect to the rider positioned directly over said shock absorber S on the motorcycle. Further, any sidewise motion is adequately absorbed by a slight flexing movement of the hitch 10, as indicated by the arrow 52 in FIG. 1. The construction of the frame 11 and the arms 12, 13 is substantially rigid however, and with the large lever arm ratio as described above, any deleterious overflexing of the hitch is prevented thereby assuring the full safety of the rider.

In view of the foregoing, it is believed that the unique advantages of a trailer hitch 10 for a sport vehicle will be appreciated by those skilled in the art. The mounting of the hitch 10 is directly to the lugs 30, 40 carried by the vehicle for the shock absorber S and with the scissors type movement of the hitch 10, said shock absorber S is capable of advantageously dissipating up and down forces 51, 50, respectively. The geometry of the hitch 10 and the adjustments at the lower end of the shock absorber S and at the pivotal joint between the frame 11 and the arms 12, 13 uniquely allow the hitch to be mounted with safety on any type vehicle having the rear mounted shock absorber S.

In this disclosure, there is shown and described only the preferred embodiment of the invention, but, as aforementioned, it is to be understood that the invention is capable of various changes or modifications within the scope of the inventive concept as expressed herein.

I claim:

1. A trailer hitch for attachment to a sport vehicle having rear mounted shock absorbers comprising a U-shaped frame extending forwardly along the sides of the rear wheel of said vehicle, first pivotal connector means for attaching the forward end of said frame to said vehicle for movement with one end of said shock absorbers, brace means interconnected at pivotal joints with said frame to support the same above the ground, means at the rear of said frame for receiving the trailer, and second pivotal connector means for attaching the forward end of said brace means to said vehicle for movement with the other end of said shock absorbers, whereby shock loads from said trailer are transmitted to said shock absorbers.

2. The combination of claim 1 wherein said first and second connector means include the mounting lugs on said vehicle for said shock absorbers.

3. The combination of claim 2 wherein said first and second connector means each includes shoulder means on said lugs for allowing free pivotal movement of said frame and said brace means with respect to said shock absorbers.

4. The combination of claim 1 wherein said brace means includes a pair of arms extending forwardly along the sides of said rear wheel.

5. The combination of claim 1 wherein the lever arm distance from said trailer receiving means to said pivotal joint is shorter by an approximate factor of three than the lever arm distance from said first connector means to said pivotal joint.

6. The combination of claim 5 wherein said joints include bushing means for allowing free pivotal movement between said arms and said frame.

7. The combination of claim 4 wherein said first connector means is located at the lower end of said shock absorbers, said frame extending substantially parallel to the ground, said second connector means being located at the upper end of said shock absorbers, said brace means extending at an acute angle to said frame.

8. The combination of claim 7 wherein said brace means includes a pair of arms extending forwardly along the sides of said rear wheel, said arms having an obtuse angle at a midpoint, the forward end of said arms extending substantially parallel to said frame, whereby interference with said shock absorbers is avoided at said second connector means.

9. The combination of claim 1 wherein said first connector means includes a plurality of apertures on said frame to allow adjustment of the rearward extent of said frame to adapt to different vehicles.

10. The combination of claim 5 wherein said pivotal joints include a plurality of apertures on said arms whereby the height of said frame above the ground can be adjusted in accordance with the operative length of said shock absorber and as required to adapt to different vehicles.